United States Patent [19]

Pfalzgraf et al.

[11] Patent Number: 5,076,232
[45] Date of Patent: Dec. 31, 1991

[54] LOAD ADJUSTMENT DEVICE

[75] Inventors: Manfred Pfalzgraf, Frankfurt am Main; Eberhard Mausner, Bad Soden, both of Fed. Rep. of Germany

[73] Assignees: VDO Adolf Schindling AG, Frankfurt am Main; Mercedes Benz AG, Stuttgart, both of Fed. Rep. of Germany

[21] Appl. No.: 583,375

[22] Filed: Sep. 14, 1990

[51] Int. Cl.$^5$ .............................................. F02D 7/00
[52] U.S. Cl. ....................................................... 123/399
[58] Field of Search ............... 123/399, 401, 361, 400, 123/342; 180/178, 179, 197

[56] References Cited

U.S. PATENT DOCUMENTS

| | | | |
|---|---|---|---|
| 4,896,640 | 1/1990 | Pfalgraf et al. | 123/399 |
| 4,919,096 | 4/1990 | Manaka et al. | 123/399 |
| 4,926,821 | 5/1990 | Porth et al. | 123/399 |
| 4,944,426 | 7/1990 | Mann | 123/361 |
| 4,953,529 | 9/1990 | Pfalzgraf et al. | 123/396 |
| 4,972,816 | 11/1990 | Mausnor | 123/399 |
| 4,986,238 | 1/1991 | Terazawa | 123/361 |

Primary Examiner—Raymond A. Nelli
Attorney, Agent, or Firm—Martin Farber

[57] ABSTRACT

A load adjustment device is formed of a setting member, and a control element which acts on the setting member to establish a power output of an internal combustion engine, an accelerator pedal, via a driver coupled to the accelerator pedal, activates the control element. The adjustment device also incldues an electric setting drive for moving the driver, and an desired-value detection element operatively connected with the driver, as well as an actual-value detection element which cooperates with the desired-value detection element and acts upon the electric setting drive. The electric setting drive is controllable as a function of values detected by an electronic control device. The driver has a free-travel element which is mounted displaceably in a direction of setting of the free-travel element. The control element engages with play in its direction of setting in the free-travel element, and the free-travel element operates with the driver under spring loading.

18 Claims, 4 Drawing Sheets

LOAD ADJUSTMENT DEVICE

FIELD AND BACKGROUND OF THE INVENTION

The present invention relates to a load adjustment device having a control element (11) which acts on a setting member (16) which determines the power output of an internal combustion engine, the control element being connected to a driver (4) which is coupled to an accelerator pedal (1) and can, in addition, be moved by means of an electric setting drive (9). The load adjustment device has a desired-value detection element (7) associated with the driver, an actual-value detection element (12) which cooperates with said desired-value detection element (7) and acts on the electric setting drive, the electric setting drive being adapted to be controlled as a function of the values detected by an electronic control device (22).

Load adjustment devices of this kind are provided in motor vehicles for actuation of the throttle valve or the injection pump by means of the accelerator pedal in order, by means of the electronic control device, to intervene in such a manner that, for instance, wheel slippage upon starting as a result of excessive power is avoided. By way of example, if the accelerator pedal is depressed too rapidly, the control device provides that the throttle valve is opened less than corresponds to the position of the accelerator pedal so that the internal combustion engine produces only a reduced power level which avoids a spinning of the wheels. Other automatic interventions in the load adjustment device are necessary if a transmission is to be switched automatically, or if the idling speed is to be set to a constant value even upon different power requirements upon idling. It is also known in the case of such an adjustment device to act by a speed-limiting controller which, by the possibility of uncoupling the control element from the accelerator pedal, provides that in each case that power is set which is necessary in order to maintain the speed set. In addition, it may be desirable, in particular from the standpoint of driving comfort, to provide a progressive or degressive coupling of the accelerator pedal, with the possibility of a reduced or increased power setting as compared with the position of the accelerator pedal.

However, safety factors make it necessary to provide assurance, even in the case of a defect in the control device that, upon backward movement of the position of the accelerator pedal, the power adjustment decreases in synchronism with the position of the accelerator pedal. This has been achieved up to now by safety devices in the electronic control device. Possibilities of defects in the control device are reduced in the manner that the electronic system is constructed with redundance. Nevertheless, too high a power setting which does not correspond to the position of the accelerator pedal is not completely excluded in the event of a defect.

Load adjustment devices of the above mentioned type are, in general, developed in several parts, i.e. certain elements are associated with the accelerator pedal while other elements cooperate with the control element. Such a separate arrangement of the parts means, on the one hand, an increase in the structural size of the load adjustment device while, on the other hand, no assurance is had by the arranging of the structural parts at different points of the vehicle that the parts will cooperate free of reaction with the throttle valve or the injection pump.

SUMMARY OF THE INVENTION

It is an object of the invention to develop a load adjustment device of the aforementioned type in such a way that it is compact and makes possible a well-defined reaction on the setting member and, thus, on the throttle valve or injection pump under all conditions of load and particularly upon failure of the electronic control device.

According to the invention, the driver (4) has a free-travel element (13) which is mounted displaceable in the direction of setting thereof (LL, VL), into which element the control element (11) engages with play in its direction of setting (LL, VL), the free-travel element (13) being urged by a coupling spring (24) connected to it and the driver (4) in the full load (VL) direction of the driver (4) and the control element (11) and the driver (4) being urged in the idling direction (LL) by means of restoring springs (6, 26).

By the development in accordance with the invention of the load adjustment device with a free-travel element, assurance is had that the control element can be moved as desired with respect to the driver within the limits established by the play and, as a result, the possibility exists in simple manner within these limits of a progressive or degressive connecting of the accelerator pedal. By the engagement of the control element into the free-travel element which is mounted in the driver, assurance is furthermore had that, upon a failure of the electronic control device, the driver and the control element are guided in geometrically defined manner with respect to each other. It is of particular importance in this connection that upon a failure of the control device, and in case of a desired value desired by the driver which is greater than the actual value, no acceleration of the vehicle takes place since the control element is moved by means of the return spring urging it into idling direction against the idling-side stop of the free-travel element.

In order to be able to control even traveling conditions of threatened wheel slippage, the possibility is finally provided of displacing the free-travel element in the driver via the control element against the force of the coupling spring in idling direction and, thus, regulating downward the setting member which determines the power of the internal combustion machine. In this connection, after the control process and positions of driver and control elements which again correlate with each other, the coupling spring again moves the free-travel element back in its starting position with respect to the driver.

The structural development of the free-travel element may in principle be any desired; assurance must merely be had that the control element engages within it in its setting direction with play and that, in order to control the anti-slip regulation, the free-travel element is guided, urged in idling direction, within the driver. The guiding of the free-travel element in the driver can be effected, for instance, along a linear guide path; the driver can also be developed as a rotary part and the free-travel element be guided along a circular path in the driver.

One particular embodiment of the invention provides that the free-travel element is developed as free-travel hook (13) and that the control element (11) engages between the legs (13a, 13b) of the free-travel hook (13) with clearance. The free-travel hook is in this connection advisedly mounted for displacement within the driver in the region of the web thereof which connects the two legs together, and the legs accordingly point in the direction of the control element, the distance between the legs and the thickness of the control element determining the clearance of the control element in the free-travel hook and the control play of driver and control element with respect to each other in the sense of a progressive or degressive connection of the accelerator pedal results therefrom.

One advantageous embodiment of the invention provides that when the electric setting drive (9) is not activated and the driver (4) is in the idling position (LL), the control element (11) comes against a stop (31) which is spring loaded in the direction opposite the idling setting direction. In this operating condition, the restoring spring which is associated with the control element pulls the latter in the idling direction while the spring of the stop positions the control element upon reaching the idling range in a defined idling position, for instance in a maximum idling position. In contradistinction to this, conditions of load in which the control element comes into idling positions of reduced load and, in this position, moves the spring-loaded stop in the direction towards minimum idling position can definitely also be controlled in the electronic control operation.

In accordance with a preferred embodiment of the invention, a distance-monitoring device (15) is provided between the driver (4) and the control element (11). The monitoring device feeds a signal for plausibility testing to the control device (22) in the event of a deviation of driver (4) and control element (11) from a pre-established spacing. The control device (22), in the event of the absence of defined plausibility conditions, uncouples or disconnects the electric setting drive (9) and mechanically forcibly guides the driver (4) and control element (11).

The distance-monitoring device (15) can be developed, in particular, as a safety contact switch by which the position of the control element (11) in the free-travel element (13) can be checked as to the plausibility conditions with respect to the instantaneous condition of travel of the vehicle driven by the internal combustion engine, in the manner that the signal is fed to the electronic control device. The safety contact switch continuously checks the position of driver and control element and is thus based essentially on the distance measurement thereof.

If defined distances of driver and control element do not correlate with distances predetermined by the conditions of travel, and agree simultaneously with plausibility conditions referred to these conditions of travel, the signal leads to a disconnecting of the electronic control device, whereby the driver and the control element are mechanically positively guided by the return springs acting on the control element and the driver and the coupling spring arranged between free-travel element and driver.

The regulating of the electronic control device via a signal is to be understood here in the sense that both the production of a signal and the absence of a signal can be interpreted in the sense of an error message for the electronic control device. For example, the electronic control device (22) can uncouple or disconnect the electric setting drive (9) in the event of the absence of a switch contact signal and the absence of defined plausibility conditions.

The safety contact circuit (15) advisedly has two safety contacts (39, 33; 40, 34, 35, 36), the one safety contact (39, 33) monitoring the idling range of the internal combustion engine, and the other safety contact (40, 34, 35, 36) monitoring the partial load and full load regions when the electric setting drive (9) is activated. Both safety contacts (39, 33; 40, 34, 35, 36) are activated in the transition region from idling to partial-load operation. The integrating of two safety contacts in the safety contact circuit makes it possible to check the functioning of the safety system continuously in the operating state since, in operation, the load adjustment device continuously changes from the idling to the partial-load/full-load region, and the signal is fed to the electronic control device only upon actuation of the safety contacts over the entire load range. The control device tests the signal with the plausibility conditions referred to the given conditions of travel.

A voltage supply path (32) for both safety contacts (39, 33; 40, 34, 35, 36) should advisedly be provided as well as a first voltage path which leads from the one safety contact (39, 33) to the control device (22), and a second voltage path leading from the other safety contact (40, 34, 35, 36) to the control device (22). In this connection a contact element (11a) can be connected to the voltage supply path (32) and, on the one hand, to the voltage path (33) extending over the idling range for the one safety contact (39, 33) and, on the other hand, to the voltage path (36) for the other safety contact (40, 34, 35, 36) extending over the partial-load/full-load region. By such a development of the load adjustment device within the region of the safety contact circuit, assurance is had that with only slight structural expense and utilizing only a small amount of space, desired switch functions can take place.

By the development of the load adjusting device in accordance with the invention, the most different conditions of load of the internal combustion can be obtained. Thus, first of all, spinning of the wheels can be counteracted in the manner that in the operating state of the anti-spin control, the free-travel element (13) is moved by the control element (11) against the force of the coupling spring (24) in the idling direction (LL).

Furthermore, a speed-limiting control can be effected in which the control element (11), in the load condition of full load (VL) is arranged at a slight distance from the stop (13a) of the free-travel element (13) on the full-load side. Finally, not only a linear but also a progressive and degressive linking of the accelerator pedal can be effected. For this purpose, the control range of the load adjustment device, which is formed between the stops (13a, 13b) of the free-travel element (13) which represent the two end positions of the control member (11), should have desired-value defaults and degressive and/or linear and/or progressive actual-value defaults which are in linear relationship to each other.

The load adjustment device of the invention is considered particularly suitable for an internal combustion engine in which the setting member of the internal combustion engine is developed as throttle valve (16) and, in addition, the driver (4), the free-travel element (13), the coupling spring (24), the control element (11), the return spring (26) of the control element (11), the desired-value and actual-value detection elements (7, 12) and the throttle valve (16) form a single structural unit. Assurance is thereby had that control processes can take place between the parts over a very small space. By the arrangement of the parts in the region of the setting member of the internal combustion engine, assurance is had furthermore that the functional chain acts directly in the region of the internal combustion engine.

Thus, for instance, the accelerator pedal can be connected via a Bowden cable directly to the driver which is located in the region of the setting membe of the internal combustion engine and is urged in idling direction by means of the return spring. The position of the driver is represented by the desired-value detection element and that of the control element by the actual-value detection element, and the values detected by the two elements are forwarded to the electronic control device which, via the electric setting drive, adjusts the regulating element cooperating with the setting member in accordance with the control characteristic preestablished between the two elements.

In detail, the load adjusting device of the invention can operate, for instance, with a potentiometer; in this case, the desired-value detection element (7) is advisedly developed as a first wiper (7), connected to the driver (4) of the default and report potentiometer (8) which has two wipers (7, 12). The actual-value detection element (12) of the foregoing potentiometer is coupled in the form of the second wiper (12) with the control element (11), the distance between the wipers (7, 12) being monitored by means of the electronic control device (22).

It would be conceivable that, despite separation of the electric setting drive, the spring urging the driver in idling direction is not able, due to a jamming of structural parts, to move the driver in the idling direction. Such an error can be represented in simple fashion, namely, that a pedal contact switch (18) is provided on the accelerator pedal (1) by means of which the action of force on the accelerator pedal by the driver can be noted.

It is of particular importance in the case of the load adjustment device of the invention that all elements of the load adjustment device which act via an electric circuit on the control element are deactivated upon failure of the electrical system, so that the load adjustment device operates mechanically via the coupling of driver and control element. Thus it is provided that the electronic control electronics (22) is disconnected in the voltage-free condition of the load adjustment device. The same applies to the electric setting drive (9), which advisedly could be adapted to be connected via a coupling (10) to the control lever (11); the coupling (10) should be opened in voltage-free or non-controlled condition of the electric setting drive (9). In principle, however, it is not necessary for a coupling to be provided. In the case of a direct coupling of the electric setting drive with the control element, it would then however be necessary in case of a failure of the electric control device to make the further return springs sufficiently strong that they can move the electrical setting drive. Thereby reactions on the driver and the accelerator pedal cannot be excluded.

In accordance with a special embodiment of the invention, the electric setting drive (9) can be regulated as a function of one or more additional control variables. One additional control variable can, for instance, be the speed of rotation of the engine, particularly the idling speed of rotation. In addition to this, there are, of particular importance, control variables which refer to the barometric pressure, cold start and thus the temperature of the engine, the gear position and thus the condition of load of the vehicle, the push operation and thus, indirectly, the speed of the vehicle; furthermore, control variables can result from the speed controller value, the antislip control and thus the determination of the speed of rotation of the wheel as well as the engine drag moment control.

BRIEF DESCRIPTION OF THE DRAWINGS

With the above and other objects and advantages in view, the present invention will become clearly understood in connection with the detailed description of preferred embodiments, when considered with the accompanying drawing, of which.

DETAILED DESCRIPTION OF THE DEFERRED EMBODIMENTS

Figure 1:
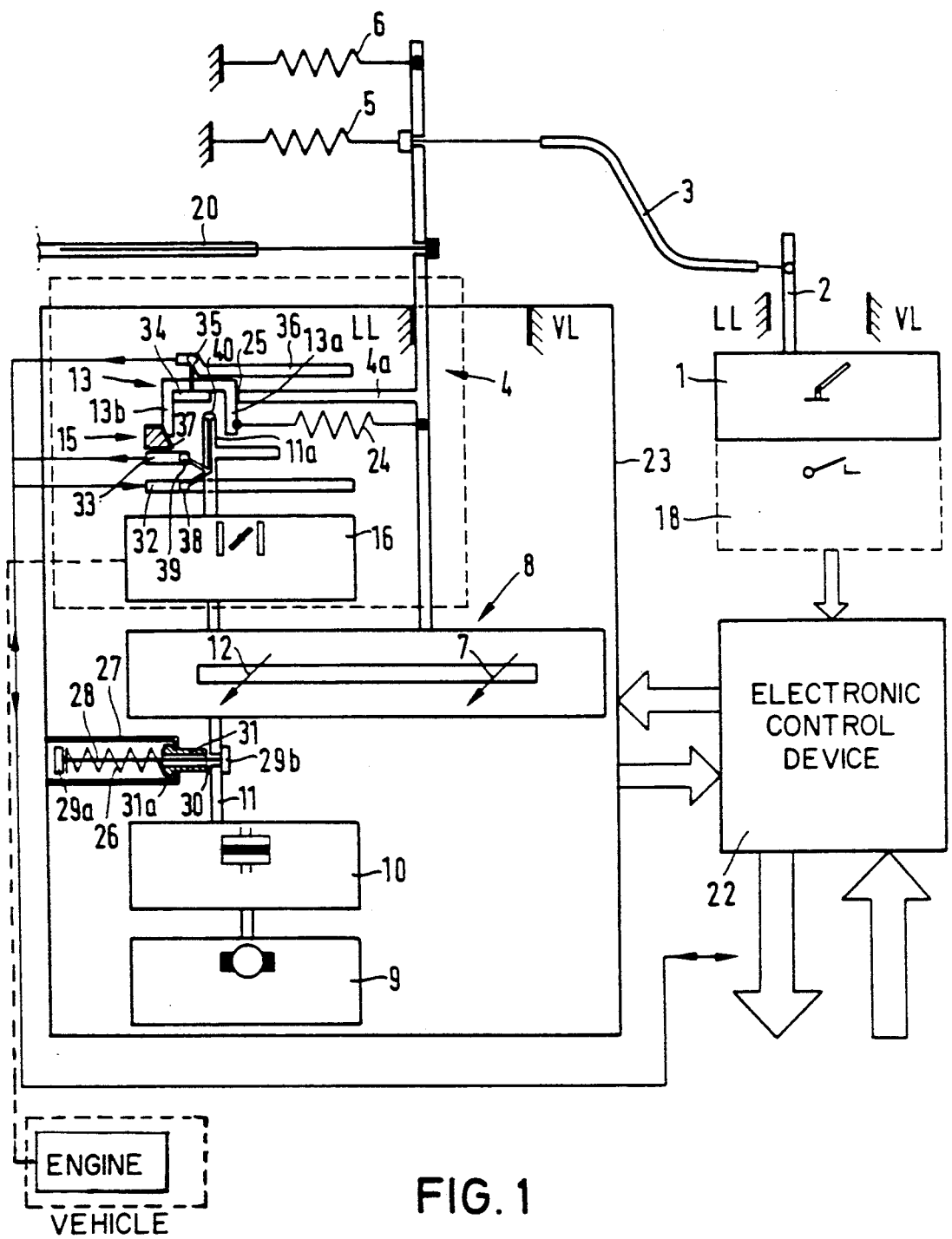
FIG. 1 is a block diagram of the load adjustment device of the invention with a setting member developed as throttle valve.

FIG. 1 shows an accelerator pedal 1 by which a lever 2 can be displaced between a full-load stop VL and an idle stop LL. Via a gas cable 3 the lever 2 can shift a driver 4 in the direction of another full-load stop VL and is urged in idling direction by a return spring 5 acting on the gas cable 3. A return spring 6 acting on the driver 4 urges it in idling direction. The driver 4 is connected with a desired-value detection element in the manner of a wiper 7 of a potentiometer 8 which controls a setting motor 9 which, via a clutch 10, can displace a control element 11. The control element 11 serves directly for the displacement of a throttle valve 16 or of a fuel injection. The position of this control element 11 is transmitted to the potentiometer 8 via an actual-value detection element, in the manner of a second wiper 12 firmly connected to the control element 11. If the control element 11 exactly follows the command of the accelerator pedal 1, the distance between the wiper 7 and the wiper 12 must remain constant.

An electronic control device 22 cooperates with the wipers 7 and 12 of the potentiometer 8, the control device 22, among other things, controlling the electric setting motor 9 and the clutch 10. Due to the possibility of representing external default values by the control device 22, the control element 11 can be moved independently of the driver 4.

A positive mechanical guidance is present between the driver 4 and the control element 11. For this purpose, the arm 4a of the driver 4 receives a free-travel hook 13 mounted for displacement in the setting direction thereof, between the two legs 13a and 13b, of which the free end 11a of the control element is mounted with play. The displaceable mounting of the free-travel hook 13 in the driver 4 can be effected in any desired manner, for instance in the manner that a projection on the free-travel hook enters into a groove in the driver. As is shown for the sake of simplicity, in FIG. 1 the free-travel hook 13 has been shown as a separate part resting against the driver 4 without showing the guides; the parts 4 and 13 can be guided in one another along a straight line or else along a curve. To the leg 13a of the free-travel hook 13 and the driver 4 there is connected a coupling spring 24 developed as tension spring which urges the free-travel hook 13 in the full-load direction of the driver 4, whereby assurance is had that the free-travel hook 13 rests in the case of control in well-defined position at the point 25 (FIG. 1) against the driver 4.

A return spring 26, developed as compression spring which urges the control element 11 in idling direction, also acts on the control element 11. The return spring 26 surrounds a piston rod 28 within a cylinder housing 27, the end of which piston rod guided in the housing 27 has an annular stop plate 29a. The end of the piston rod 28 extending out of the housing 27 passes through a cutout 30 in the control element 11 and another annular stop plate 29b present at this end engages behind the control element 11. Finally, there is provided within the housing 27 a spacer 31 which surrounds the piston rod 28 in the region of emergence from the housing 27 and is acted on by the return spring 26 so that when resting against a stop 31a arranged on the spacer 31, it comes to lie slightly spaced from the control element 11. In the partial-load and full-load regions, the return spring 26 thus produces a restoring force on the control element 11 and, as a result of the simultaneous action of the return spring 26 on the spacer 31, and the geometrical design of the parts, the control element 11 is held in the region of maximum idling position in force equilibrium between the spacer 31 and the stop plate 29. In addition, a transfer of the control element 11 by the setting motor 9 against the force of the return spring 26 upon displacement of the spacer 31 into the housing is possible.

As can be noted from FIGS. 1 to 5, the load adjustment device is provided in the region of the arm 4a of the driver 4 of the free-travel hook 13 and the end 11a of the control element 11 with a distance-monitoring device for the driver 4 and the setting element 11. Said device comprises a safety contact circuit by which the position of the part 11a of the control element 11 in the free-travel hook 13, with respect to the state of travel at the time the vehicle is driven by the internal combustion engine, can be checked for plausibility conditions in the manner that the electric control device 22 is fed a signal as indicated by the arrows in FIG. 1. In this connection, upon absence of the signal and given plausibility conditions, the electric setting motor 9 is disconnected by means of the clutch 10 and the load adjustment device thus functions solely mechanically, i.e. by the mechanical coupling of driver 4 and control element 11 by the free-travel hook 13 and the springs 6, 24 and 26.

In detail, the safety contact switch has a voltage supply path 32 which extends parallel to the direction of movement of the arm 4a of the driver 4, and extends over the entire load range of the load adjustment device, as well as a contact path 33, parallel thereto, for a first safety contact which extends only over the idling range with slight extension to the partial-load region.

Finally, the free-travel hook 13 is provided, parallel to the voltage supply path 32, with a contact path 34 which extends from the leg 13b of the free-travel hook 13 up to slightly more than one-half the distance between the two legs 13a, 13b and faces the end 11a of the control element 11. From this contact path 34, a contact element 35 extends through the web which connects the two legs 13a and 13b of the free-travel hook 13, the contact path continuously contacting a contact path 36 which covers the partial-load/full-load region and extends slightly into the idling region, for overlapping with the contact path 33.

The contact path 36 is provided in the partial-load region with a bend, the corresponding follow-up movement of the free-travel hook being produced by a form-locked engagement, not shown in detail, of the free end of the leg 13b of the free-travel hook 13 in a ramp bevel 37 developed in accordance with the bend. The end 11a of the control element 11 finally has three contact elements 38, 39 and 40 which are connected in electrically conductive manner to each other, the contact element 28 contacting the voltage supply path 32 and the contact element 39 in the idling region being able to contact the voltage path 33 while the contact element 40 which is arranged at the end point of the control element 11 in the partial-load/full-load region can contact the contact path 34.

Figure 2:
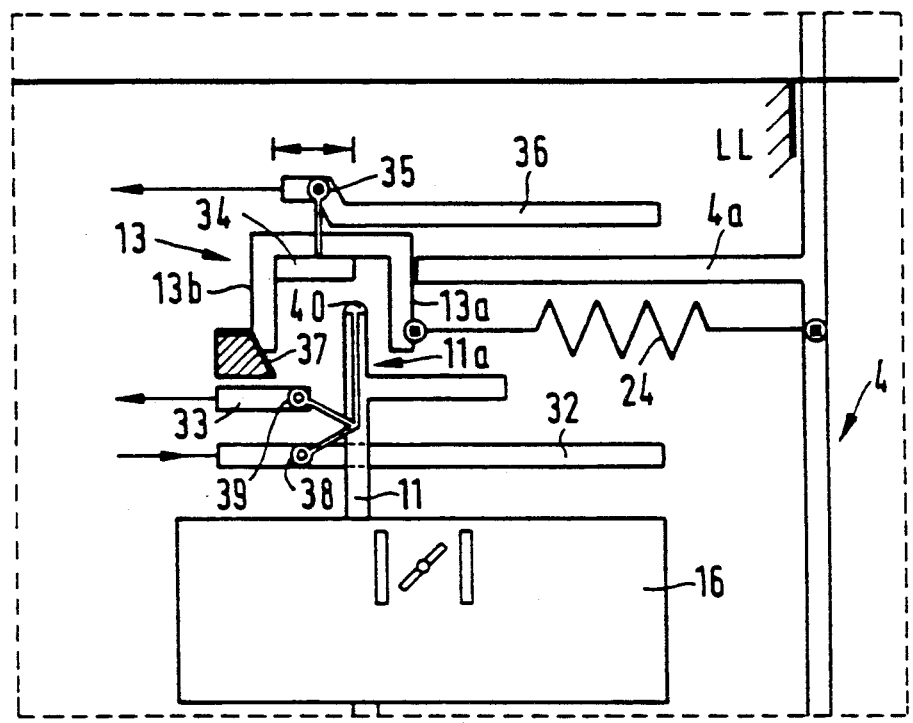
FIG. 2 is a detailed showing of the load adjustment device in the region of driver, free-travel hook and control element in the function of the idling control, shown in the maximum idling position.
Figure 3:
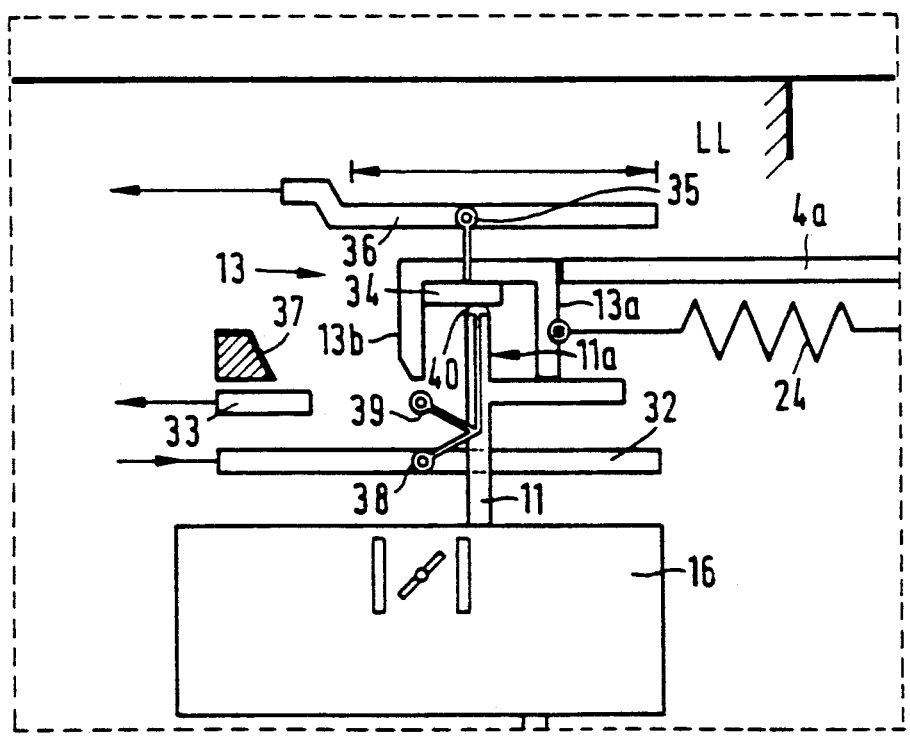
FIG. 3 is a showing in accordance with FIG. 2 in the function of the follow-up control, shown for partial load.

Starting from the maximum idling position shown in FIGS. 1 and 2, this means that when the load adjustment device is operating properly and pre-established plausibility conditions are present, one of the contact paths 33 and 36 is always acted on by current via the voltage supply path 32. Thus, up to the maximum idling position shown in FIGS. 1 and 2, the contact element 39 contacts the contact path 33. Upon transition to the partial-load operation, the contact path 34 is brought via the ramp bevel 34 into electrically conducive connection with the contact element 40 and thus, at the same time, the contact path 36 is also provided with current in the transition phase to the partial-load operation. When this has taken place, the contacting of the contact path 33 terminates and, as can be noted from FIG. 3, until the full-load position is reached, the contact path 36 is exclusively contacted via the contact element 40. In travel operation the continuous change in contact thus leads to a continuous checking of the function of the electronically controlled load adjustment device. If both voltage paths are in each cased without current passing over them and plausibility conditions are not present, this leads to a disconnecting of the electronic control device, whereby the load adjustment device is mechanically operated further.

Figure 4:
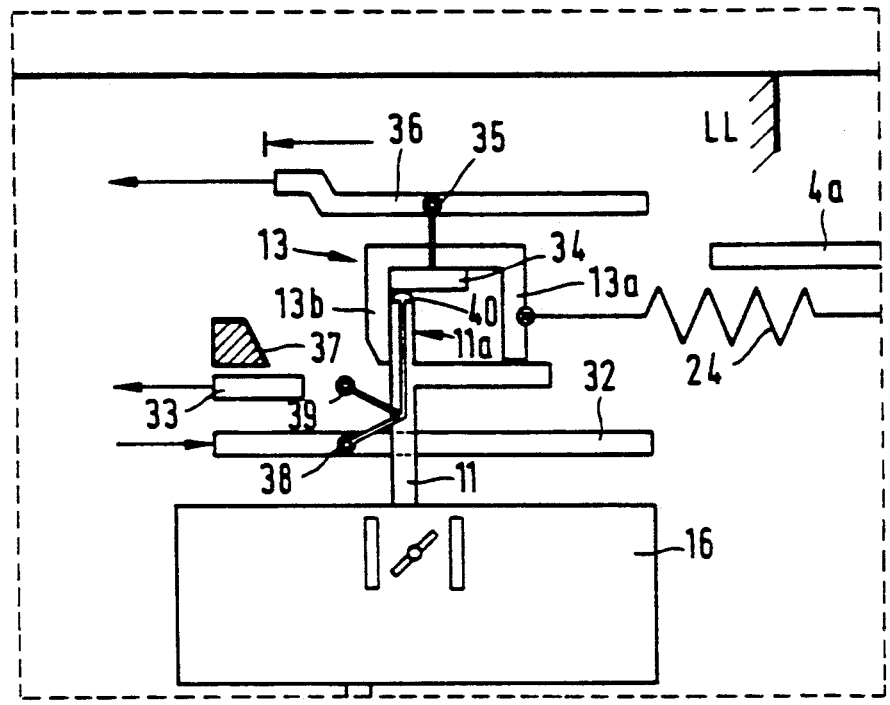
FIG. 4 is a showing in accordance with FIG. 2 in the function of the anti-slip control, shown for the process of downward regulation.
Figure 5:
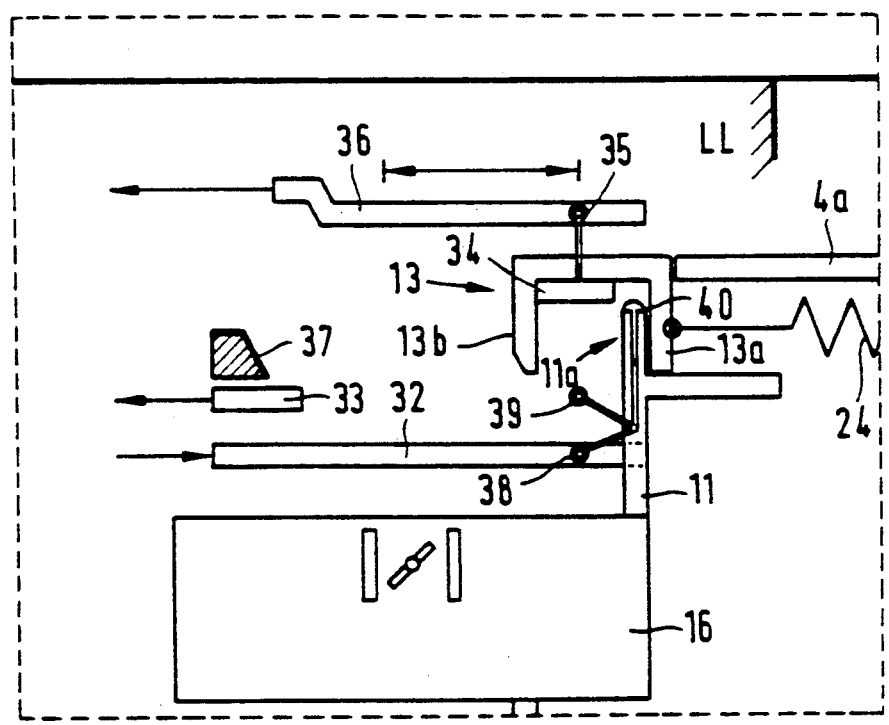
FIG. 5 is a showing in accordance with FIG. 2 in the function of the speed limiting control, shown in full-load position.

Special travel conditions under which the plausibility conditions are satisfied are shown, for instance, in FIGS. 4 and 5. FIG. 4 shows the case of the anti-slip control with which, based on the control command of the electrical control device, the setting motor moves the control element 11, independently of the position of the driver 4 predetermined by the operator command, in idling direction against the force of the coupling spring 24 away from the arm of the driver 4. In this case the plausibility condition for the electric control device results on the basis of the recognition of impending wheel slippage at measurement points in the region of the wheels. FIG. 5 shows the case of speed-limiting control under full load in which, by action of the electric setting motor, the control member 11 has been moved so far in the direction of full load that it rests against the leg 13a of the free-travel hook 13 and the contact path 36 is thus not contacted. Here also, the electronic control device recognizes the presence of the plausibility condition since the travel command of the speed-limiting control was given to it.

Figure 6:
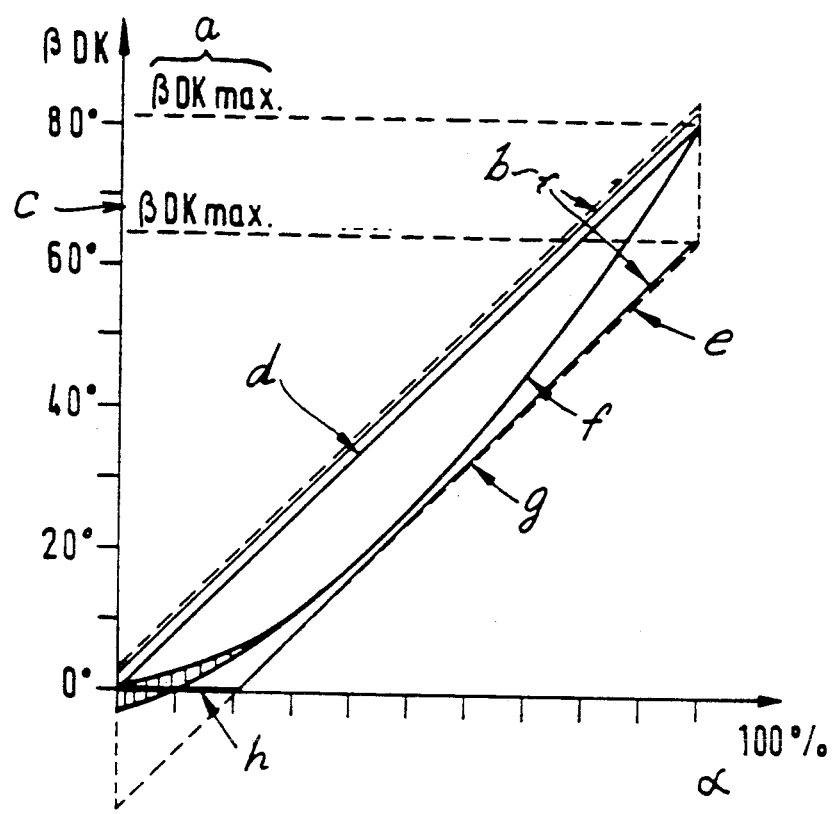
FIG. 6 is a function diagram serving to explain the dependence of the opening angle of the throttle valve $\beta_{DK}$ on the pedal angle $\alpha_{Pedal}$.
Figure 7:
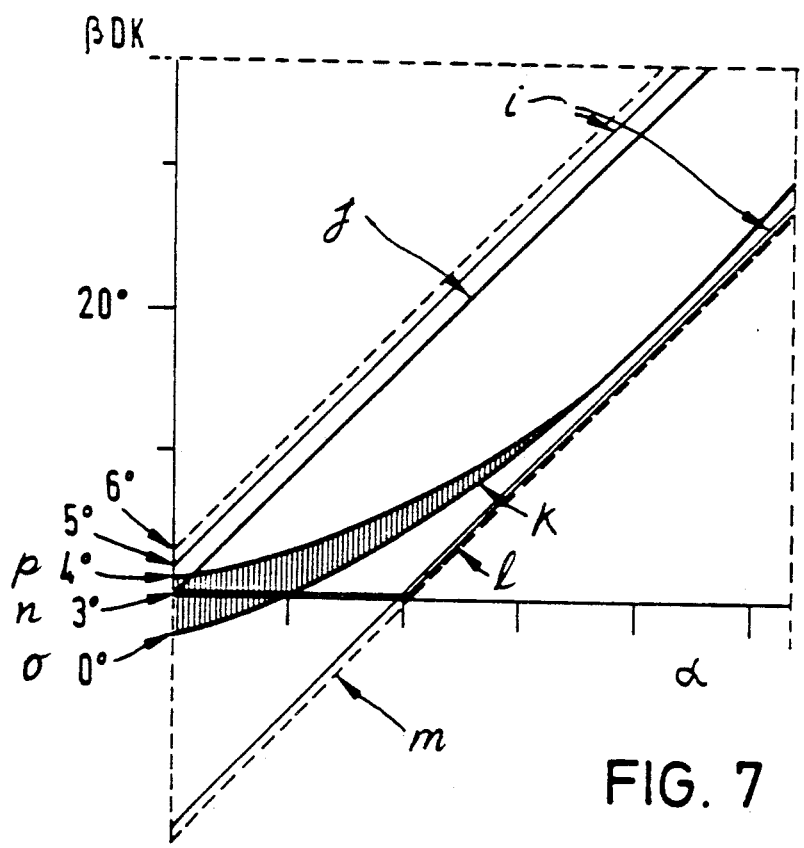
FIG. 7 is the function graph shown in FIG. 6 in the region of small angles.

FIGS. 6 and 7 are function diagrams of the load adjusting device of the invention. There is first of all shown the travel range resulting on basis of the development of the free-travel hook 13, indicated by the dash lines extending parallel to each other. Within this travel range, if the desired-value command which corresponds to the position of the driver is then given by the operator of the car, then, on basis of the electric control device, the desired-value command is converted into a low pedal-angle region in a degressive course and, in case of high pedal angles, in a progressive course, of the actual-value characteristic curve which corresponds to the position of the control element and thus of the throttle member.

FIG. 6 shows in this connection, in particular, that the actual-value characteristic curve can be definitely more strongly or weakly degressively developed in the low pedal-angle region. If an actual value which comes to lie outside the travel range is to be recorded, this leads, upon the reaching of the safety contact switch point shown in the graph, to the electronic control of the load adjustment device being placed out of operation and transformed into emergency operation. As shown in the graph, in emergency operation the development of the free-travel hook has the result that, starting from the idle position, an increase in the pedal angle does not lead to any change in the throttle-valve angle in the sense of an opening of the throttle valve, but that this takes place only upon an increased pedal angle when the leg 13b of the free-travel hook 13 comes against the control element 11. Due to the geometrical development of the free-travel hook 13, it is then also only possible with fully depressed accelerator pedal to obtain a smaller opening angle of the throttle valve, which means a reduction in power as compared with the electronic control.

The frame 23 shown in FIG. 1 is intended to indicate that the parts contained within the frame represent a single structural unit.

For the event that, after the release of the accelerator pedal 1, the driver 4 and the control element 11 cannot be shifted in the idling direction, a pedal contact switch 18 is provided on the accelerator pedal 1 by which such incorrect condition can be noted. For the sake of completeness, an automatic pull member 20 of an automatic transmission, not shown in detail, by which the driver 4 can also be displaced is shown in FIG. 1.

LEGENDS OF FIGS. 6 AND 7 a = βDK max
b = safety contact switch point
c = βDK max emergency operation
d = desired-value command
e = free-travel hook
f = actual-value characteristic curve
g = emergency operation characteristic curve
h = emergency operation characteristic curve
i = safety contact switch point
j = desired-value command
k = actual-value characteristic curve
l = emergency operation characteristic curve
m = free-travel hook
n = idling emergency operation 3°
o = idling minimum 0°
p = idling maximum 4°

We claim:

1. A load adjustment device comprising
a setting member, and a control element which acts on the setting member to establish a power output of an internal combustion engine;
an accelerator pedal, and a driver coupled to the accelerator pedal, the control element being connected to the driver;
an electric setting drive for moving the driver;
a desired-value detection element operatively connected with the driver;
an actual-value detection element which cooperates with the desired-value detection element and acts upon the electric setting drive;
an electronic control device, the electric setting drive being controllable as a function of values detected by the electronic control device;
a coupling spring and restoring springs; and wherein
the driver has a free-travel element which is mounted displaceably in a direction of setting of the free-travel element;
the control element engages with play in its direction of setting in the free-travel element;
the free-travel element is connected to the coupling spring, and is urged by the coupling spring and the driver in the full load direction of the driver; and
the control element and the driver are urged in an idling direction by means of the restoring springs.

2. A load adjustment device according to claim 1, wherein
said free-travel element is developed as a free-travel hook having two legs; and
said control element engages between the legs of the free-travel hook with clearance.

3. A load adjustment device according to claim 1, further comprising a first stop, and
wherein upon deactivation of said electric setting drive, and upon said driver being in the idling position, said control element comes against said first stop, said first stop being spring loaded in a direction opposite the idling setting direction.

4. A load adjustment device according to claim 1, further comprising
a distance-monitoring device disposed between said driver and said control element, said monitoring device feeding a signal for plausibility testing to said control device in the event of a deviation of said driver and said control element from a pre-established spacing; and
wherein said control device, in the event of the absence of defined plausibility conditions, uncouples said electric setting drive and mechanically forcibly guides said driver and said control element.

5. A load adjustment device according to claim 4, further comprising
a switch contact connected to said accelerator pedal for providing a switch contact signal; and wherein
said electronic control device is operative to uncouple said electric setting drive in the event of absence of said switch contact signal and the absence of defined plausibility conditions.

6. A load adjustment device according to claim 4, wherein
said distance-monitoring device is developed as a safety contact circuit by which the position of said control element in the free-travel element can be checked as to the plausibility conditions with respect to the instantaneous condition of travel of a vehicle driven by the internal combustion engine.

7. A load adjustment device according to claim 6, wherein
said safety contact circuit has two safety contacts a first of said safety contacts monitoring an idling range of the internal combustion engine and a second of said safety contacts monitoring a partial load region and a full load region upon activation of said electric setting drive, said first and second safety contacts being activated in a transition region from idling to partial-load operation.

8. A load adjustment device according to claim 7, further comprising
a voltage supply path for said first and said second safety contacts;
a first voltage path which leads from said first safety contact to said control device;
a second voltage path leading from said second safety contact to said control device; and
said load adjustment device further comprises a contact element connectable to said voltage supply path and to said first voltage path, said first voltage path extending over the idling range for said first safety contact and, said second voltage path for said second safety contract extending over the partial-load/full region.

9. A load adjustment device according to claim 1, wherein, in the operating state of an anti-spin control, said free-travel element is moved by said control element against the force of said coupling spring in the idling direction.

10. A load adjustment device according to claim 1, further comprising a first stop of said free-travel element; and
wherein said control element, in the load condition of the speed limiting control with full load, is arranged at a slight distance from said first stop of the free-travel element on the full-load side.

11. A load adjustment device according to claim 10, further comprising
a second stop of said free-travel element; and
wherein a control range of the load adjustment device, which control range is formed between said first and said second of said free-travel element which represent two end positions of the control member (11), has desired-value defaults and degressive and/or linear and/or progressive actual-value defaults which are in linear relationship to each other.

12. A load adjustment device according to claim 1, wherein
said setting member of the internal combustion engine is developed as throttle valve and, in addition, said driver, said free-travel element, said coupling spring, said free-travel element, said coupling spring, said control element, a restoring spring of said control element, said desired-value and said actual-value detection elements, and said throttle valve from a single structural unit.

13. A load adjustment device according to claim 1, wherein,
said desired-value detection element comprises a first wiper of a default and report potentiometer, the potentiometer having second wiper, said first wiper being connected to said driver, said second wiper serving as said actual-value detection element and being connected to said control element, a distance between said first and said second wipers being monitored by means of said electronic control device.

14. A load adjustment device according to claim 1, further comprising
a pedal contact switch operatively coupled to said accelerator pedal.

15. A load adjustment device according to claim 1, wherein
said electronic control device is disconnected in a voltage-free condition of the load adjustment device.

16. A load adjustment device according to claim 1, further comprising a coupling; and
wherein said electric setting drive, is connectable via said coupling to said control element.

17. A load adjustment device according to claim 16, wherein
said coupling is opened in a non-controlled condition of said electric setting drive.

18. A load adjustment device according to claim 1, wherein
said electric setting drive is regulated as a function of one or more additional control variables.

* * * * *